United States Patent [19]

Shinada

[11] Patent Number: 5,079,568
[45] Date of Patent: Jan. 7, 1992

[54] SIMULTANEOUS MULTI-BEAM OPTICAL MODULATOR DEVICE USING MEMORY MAPPED SIGNALS TO ADJUST FOR CONSTANT LIGHT BEAM INTENSITY

[75] Inventor: Hidetoshi Shinada, Kanagawa, Japan

[73] Assignee: Fuji Photo Film Co., Ltd., Kanagawa, Japan

[21] Appl. No.: 599,576

[22] Filed: Oct. 18, 1990

[30] Foreign Application Priority Data

Oct. 19, 1989 [JP] Japan .................. 1-272332

[51] Int. Cl.⁵ ............................... G02F 1/11
[52] U.S. Cl. ........................ 346/108; 359/285
[58] Field of Search .......... 346/108, 160, 76 L; 358/300, 302; 350/358

[56] References Cited

U.S. PATENT DOCUMENTS

| | | | |
|---|---|---|---|
| 3,744,039 | 7/1973 | Hrbeck | 350/358 |
| 3,935,566 | 1/1976 | Snopko | 350/358 |
| 4,201,455 | 5/1980 | Vadasz et al. | |

FOREIGN PATENT DOCUMENTS

| | | |
|---|---|---|
| 53-9856 | 4/1978 | Japan . |
| 54-5455 | 1/1979 | Japan . |
| 55-29414 | 2/1980 | Japan . |
| 57-41618 | 3/1982 | Japan . |
| 63-5741 | 2/1988 | Japan . |

*Primary Examiner*—Benjamin R. Fuller
*Assistant Examiner*—Scott A. Rogers
*Attorney, Agent, or Firm*—Sughrue, Mion, Zinn, Macpeak & Seas

[57] ABSTRACT

A simultaneous multi-beam optical modulator device which has first modulators for amplitude modulating a plurality of carrier waves according to a plurality of input signals to produce a plurality of modulated signals and an audio optical device for separating an incoming beam of light into a plurality of sub-beams and for, at the same time, optically modulating the sub-beam upon receiving the modulated signals from their respective first modulators, is provided, further comprising an output device for storing indicator signals corresponding to the number of input signals fed to the first modulators and for selecting from these stored signals a signal corresponding to the number of input signals to the first modulators, a digital/analog converter for converting the signal transmitted from the output device into an analog output which is used to varies the intensity of output light, and a second modulator for amplitude modulating the plural modulated signals transmitted from the first modulators according to the analog output of the digital/analog converter. Accordingly, the intensity of a light output from the audio optical device can be maintained constant.

12 Claims, 6 Drawing Sheets

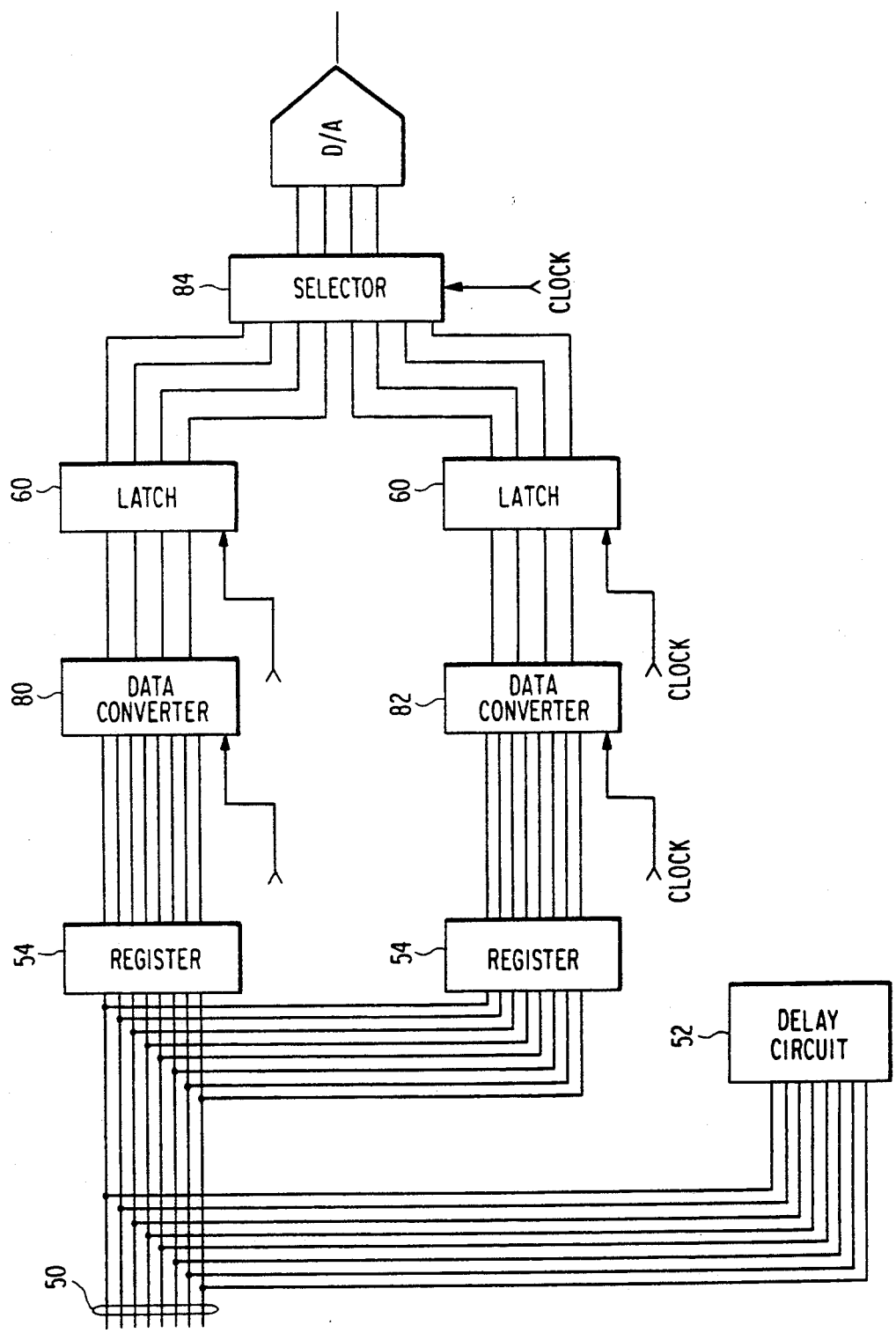

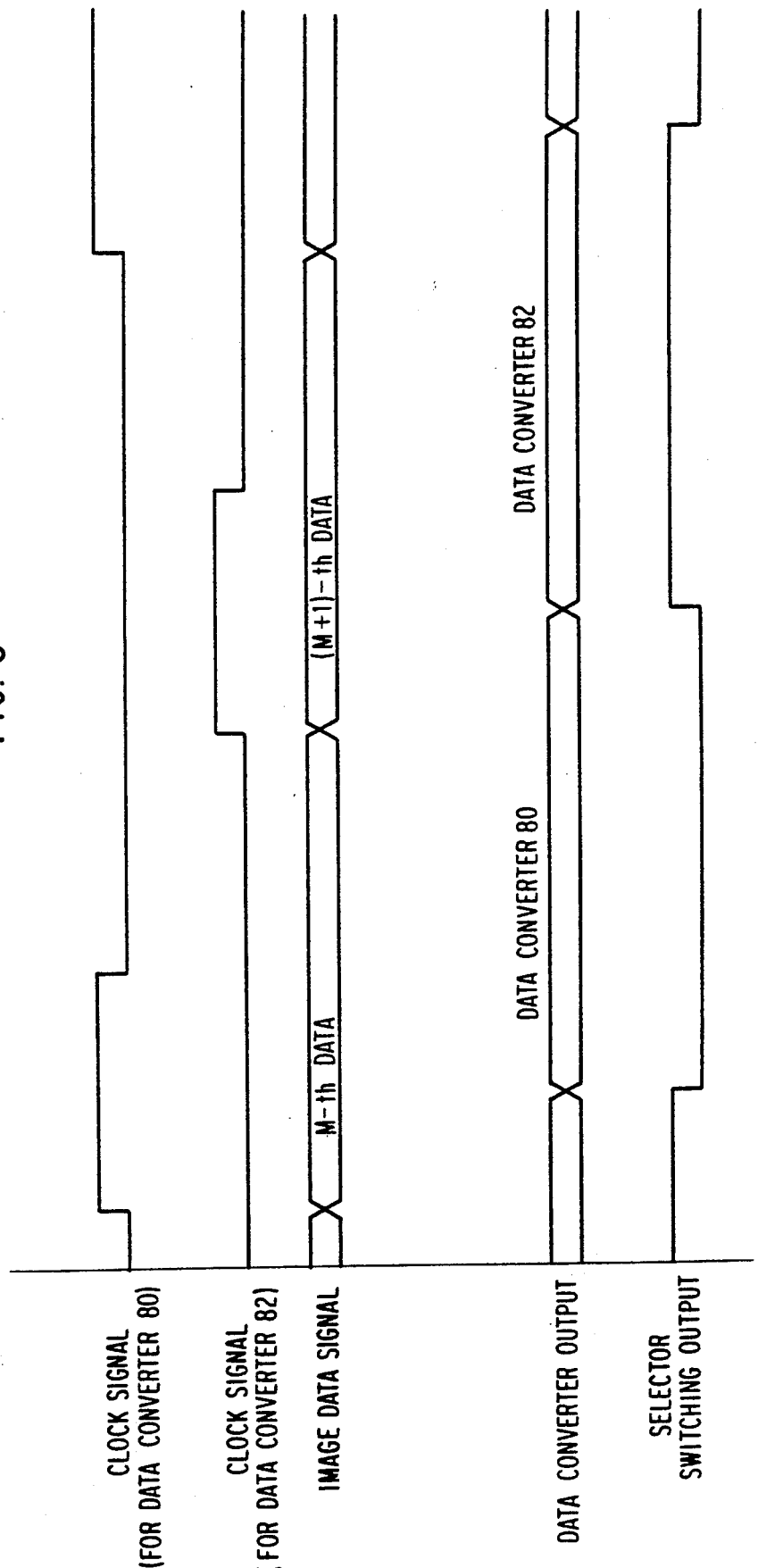

SIMULTANEOUS MULTI-BEAM OPTICAL MODULATOR DEVICE USING MEMORY MAPPED SIGNALS TO ADJUST FOR CONSTANT LIGHT BEAM INTENSITY

BACKGROUND OF THE INVENTION

1. Field of the Invention

The present invention relates to a simultaneous multi-beam optical modulator device for use with a laser recording apparatus adapted for recording an image by separating a laser beam derived from a laser emitter into a plurality of components with an audio optical device and simultaneously, emitting a plurality of beams.

2. Description of the Related Art

A laser recording apparatus is known in which, for modulation of a laser beam, the laser beam is optically modulated by a single audio optical device in accordance with a plurality of different pieces of information so that each primary light beam of a Bragg diffraction carries a fragment of the information to a recording station. However, the disadvantage of such a laser recording apparatus is that the intensity of modulated light varies according to the number of input image signals supplied to a modulator and the output laser beams fail to be constant in intensity thus causing recording images to exhibit less consistency.

A simultaneous multi-beam optical modulator device has been proposed having a means for preventing the consistency error in recording images.

For example, modulator device such as is disclosed in Japanese Patent Application Publication No. 63-5741 allows image signals to be processed by identifying the number of image signals supplied to the modulator device, generating a number of pulses corresponding to the number of input image signals with the use of a signal identifier, counting the number of pulses with a counter upon receiving a pulse signal from the signal identifier, converting the counted number into an analog output with a digital/analog converter, and modulating the amplitude of the image signals with the modulator device according to the analog output.

A drawback in the aforementioned arrangement is that an extensive period of time is required for determining the degree of amplitude modulation, from the completion of counting to the conversion of the counted number into an analog output, due to counting the number of ON image signals with the counter in each procedure, and thus, the image signals have to be delayed, which will result in a longer duration of time for recording an image.

Also, another modulator device has been introduced in which a plurality of image signals from a signal source are summed up with an adder for detection of a sum level and a gain in an AGC (Automatic Gain Control) circuit is controlled by the sum level for determining the degree of amplitude modulation (Refer to Japanese Patent Application Laid-Open No. 54-5455). It, however, takes time for detecting the sum level due to summing image signals from the signal source with the adder in a sequential manner, and the image recording period is thus extended, as in the technique disclosed in Japanese Patent Application Publication No. 63-5741. Some more modulator devices employing adders are disclosed in e.g. Japanese Patent Application Laid-Open Nos. 57-41618 and 55-29414, exhibiting the same drawback as that disclosed in Japanese Patent Application Laid-Open No. 54-5455.

A further modulator device, disclosed in Japanese Patent Application Publication No. 53-9856, employs a logic circuit in place of the adder, still exhibiting the disadvantage of requiring a considerable length of time for recording an image.

SUMMARY OF THE INVENTION

A primary object of the present invention is, in view of the foregoing aspects, to provide an improved, simultaneous multi-beam optical modulator device capable of supplying light beams of constant intensity regardless of the number of input signals, and also, of facilitating the setting of intensity for minimizing the duration of image recording.

A simultaneous multi-beam optical modulator device according to the present invention, which has a first modulating means for amplitude modulating a plurality of carrier waves according to a plurality of input signals to produce a plurality of modulated signals, and an audio optical device for separating an incoming beam of light into a plurality of sub-beams and for, at the same time, optically modulating the same upon receiving the plural modulated signals from the first modulating means, comprises:

an output means having a map in which indicator signals corresponding to the number of input signals fed to the first modulating means are stored and which is adapted to select from the map an indicator signal corresponding to the number of the input signals supplied to the first modulating means, when said output device is made to receive signals which are the same in number as the input signals being input to the first modulating means;

a digital/analog converting means for converting the indicator signal transmitted from the output means into an analog output which enables adjustment of the output of light from the audio optical device in proportion to the indicator signal from the output means so as to make the light output constant in intensity;

a delay means for delaying the plural input signals supplied to the first modulating means for a given amount of time; and a second modulating means for amplitude-modulating the plural modulated signals transmitted from the first modulating means according to the analog output of the digital/analog converting means for supply to the audio optical device.

In operation, signals which are the same in number as the input signals fed into the first modulating means are supplied to the output means. The output means containing the map in which indicator signals corresponding to the number of input signals supplied to the first modulating means are stored, delivers an indicator signal corresponding to the number of input signals. More specifically, the output means can transmit its indicator signal output to the digital/analog converting means instantly without counting the number of ON input signals.

The signal from the digital/analog converting means is then fed into the second modulating means. The plural modulated signals from the first modulating means are amplitude-modulated by the second modulating means, so as to maintain the intensity of light output constant regardless of the number of the ON image signals. Accordingly, the intensity of laser output is no longer affected by the number of ON image signals and remains constant for the writing of information. The number of ON image signals is obtained instantly and the delay time for supply of the image signals to the first modulating means is shortened, whereby the duration time for recording an image is minimized.

As described above, the simultaneous multi-beam optical modulator device according to the present invention can output a beam of light at a constant intensity regardless of the number of signals input, and also, can facilitate the setting of intensity, thus reducing the duration time of image recording.

BRIEF DESCRIPTION OF THE DRAWINGS

FIG. 7 is a block diagram of an optical modulator device for parallel processing image data signals; and FIG. 8 is a diagram showing a primary part of the time chart associated with the optical signal modulator device shown in FIG. 7.

DETAILED DESCRIPTION OF THE PREFERRED EMBODIMENT

Figure 2:
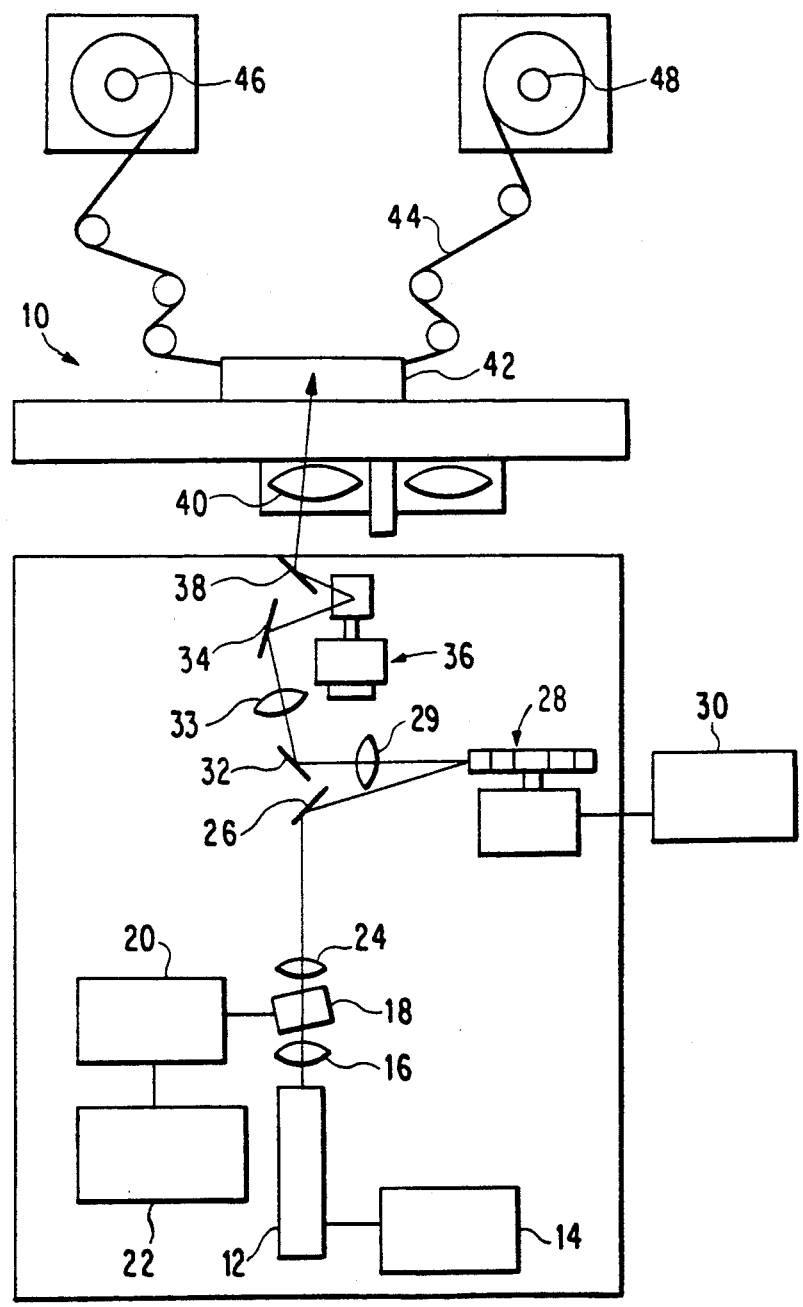
FIG. 2 is a schematic view showing the arrangement of a laser recording apparatus.

FIG. 2 illustrates a laser beam recording apparatus 10 provided with a simultaneous multi-beam optical modulator device according to the present invention.

A laser diode 12 emits a laser beam in response to an ON/OFF signal from a laser power source 14. The laser beam is then transmitted via a lens 16 to an audio optical modulator 18 (referred to as an AOM hereinafter) which serves as a substantial component of the simultaneous multi-beam optical modulator device.

The AOM 18 is controlled by an AOM driver 20 which is in turn coupled to an optical modulator circuit 22 which also serves, like the AOM 18, as a substantial component of the simultaneous multi-beam optical modulator device. The optical modulator circuit 22 is adapted to control the AOM driver 20 for varying the optical modulation of the AOM 18, as will be described in more detail later.

8 sub-beams (excluding 0-component beam) split from the laser beam, in this embodiment, are then transmitted from the AOM 18 via a lens 24 and a mirror 26 to a polygon mirror 28. The polygon mirror 28 is rotated at a high speed by a polygon mirror driver 30 to reflect the sub-beams with the reflective sides thereof for master scanning. The sub-beams reflected on the reflective sides of the polygon mirror 28 enter a scanning lens 29, and then pass, via a mirror 32, a relay lens 33, and a mirror 34, through a galvanometer 36. The galvanometer 36 has a reflective face thereof movable in a sub-scanning direction. This reflective face moves in the sub-scanning direction upon the completion of each main scanning action of a laser beam so as to change the direction of reflection of the laser beam.

The laser beams reflected by the galvanometer 36 pass via a mirror 38 and a lens 40 to a stage 42 across which a recording medium 44 runs. The beams are projected onto the recording medium 44 to record a given image.

Both the lengthwise ends of the recording medium 44 are wound on two reels 46 and 48 respectively so that the recording medium 44 can move a distance from the reel 46 to the other reel 48 after the recording of each image.

Figure 1:
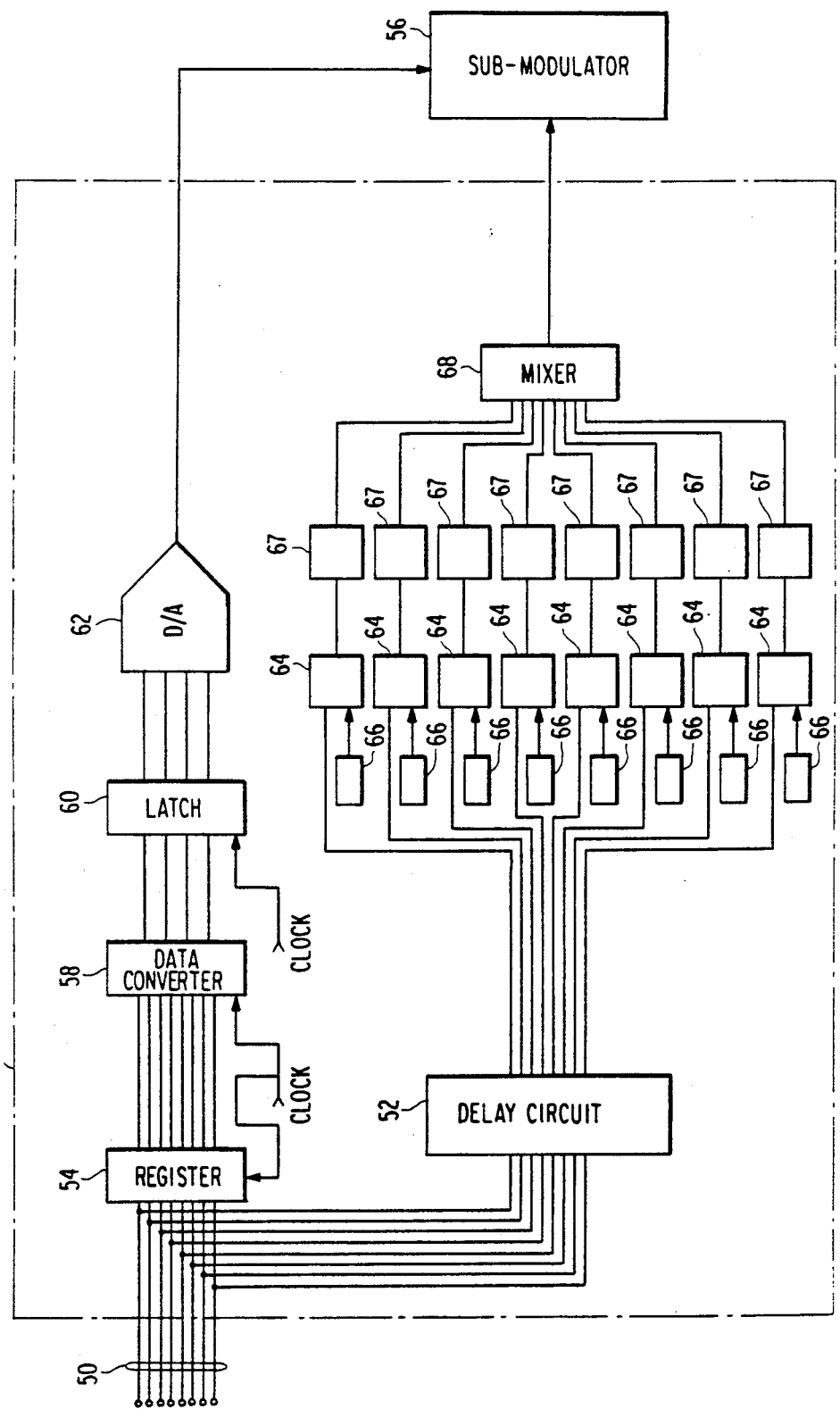
FIG. 1 is a block diagram of an optical modulator circuit.

As shown in FIG. 1, the optical modulator circuit 22 is also connected with a signal cable 50 for transferring image data signals corresponding to the number of sub-beams into which the incoming beam has been split by the AOM 18. The signal cable 50 is coupled to both a delay circuit 52 and a register 54 in the optical modulator circuit 22. The register 54 is also supplied with a clock signal input which controls the timing of the taking in of image data signals. The delay circuit 52 is arranged to delay the image data signals for a given amount of time and then, deliver them to main modulators 64 which serve as the first modulating means.

The image data signals supplied to the register 54 are then transmitted to a data converter circuit 58 as an output means. The data converter circuit 58 has a map memory designating the relationship between ON signals of the 8 image data inputs and corresponding 4-bit signals, so that in operation, each 4-bit signal is selectively output in response to the number of ON image data signals which is derived from the signal input.

The 4-bit signal from the data converter circuit 58 is then latched by a latch circuit 60. The latch circuit 60 is supplied with a clock signal and passes the 4-bit signal according to the timing determined by the clock signal. The latch circuit 60 is coupled at the downstream end to a digital-to-analog converter 62 where the 4-bit signal is converted into an analog output. The analog output is further transferred to a sub-modulator 56 which serves as a second modulating means.

Figure 4:
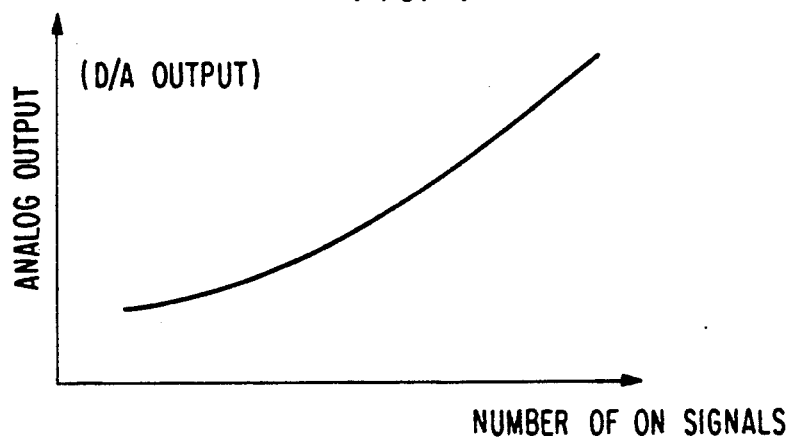
FIG. 4 is a diagram showing the characteristic relation between the number of ON image data signals and the amount of analog output.

The analog output from the digital/analog converter 62 increases in amount if the number of the ON image data signals increases, as shown in FIG. 4.

The main modulators 64 are coupled to oscillators 66 respectively which are different in oscillating frequencies so as to modulate their respective signals to desired frequencies for separation of the beam of the AOM 18. As shown the modulation carried out by each main modulator 64 involves the intensity of light from the submodulator 56, which varies inversely with respect to the number of ON image data signals input, in opposite fashion to the analog signal shown in FIG. 4. Each of the main modulators 64 is coupled by an amplifier 67 to a mixer 68. The mixer 68 combines all the image data signals from the main modulators 64 for feeding to the sub-modulator 56 which in turn transmits a combined signal output to the AOM driver 20.

Figure 3:
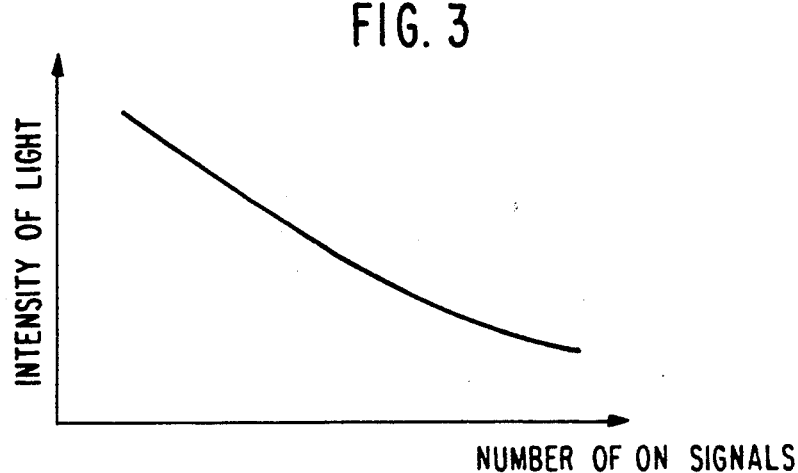
FIG. 3 is a diagram showing the characteristic relation between the intensity of light and the number of ON image data signals supplied from a main modulator in the case in which the modulation of each image data signal by a sub-modulator is constant.
Figure 5:
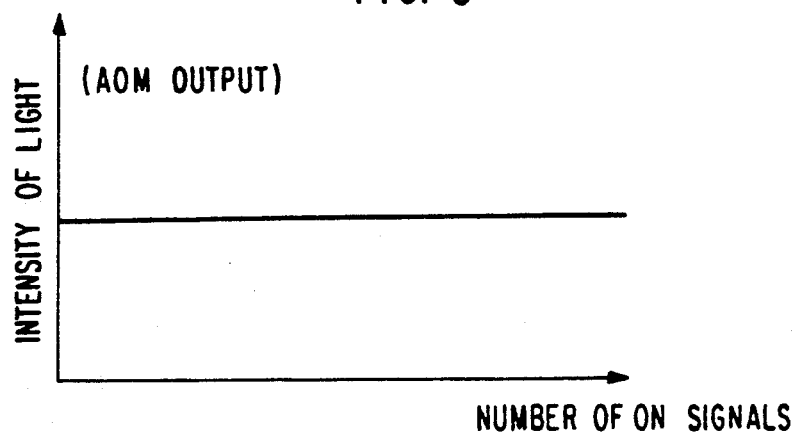
FIG. 5 is a diagram showing the characteristic relation between the intensity of light and the number of ON image data signals supplied from an audio optical modulator.

In operation, each image data signal passing the corresponding main modulator 64 is modulated by the sub-modulator 56 according to the number of corresponding ON image data signals input, so as to exhibit a property equal to the combination of the characteristic curves shown in FIGS. 3 and 4, allowing the AOM 18 to deliver a laser beam of constant intensity regardless of the number of the ON image data signals (see FIG. 5).

The operation of the present embodiment will be described in more detail referring to the time chart shown in FIG. 6.

The image data signals are fed into the register 54 according to the timing determined by a clock signal, and simultaneously supplied to the delay circuit 52, where they are delayed for a given amount of time prior to being transmitted to their respective main modulators 64 for primary modulation and then to the sub-modulator 56. The image data signals from the register 54 are then transmitted to the data converter circuit 58 where one particular 4-bit signal is selected from the stored signal information with the use of a built-in map indicating the relation between the number of ON image data signals and corre-sponding 4-bit signal. The duration of time from the supply of the image data signals to the data converter circuit 58 to the output of the 4-bit signal is relatively short because it is only necessary to select a 4-bit signal by use of the map. In this embodiment, the period from the input of image data signals to the register 54 to the output of a 4-bit signal from the data converter 58 is 30 nanoseconds, as shown in FIG. 6.

The 4-bit signal from the data converter circuit 58 is first latched by the latch circuit 60, and then transmitted to the digital/analog converter 62 according to the timing determined by a clock signal. The digital/analog converter 62 converts the 4-bit signal (a signal corresponding to the number of ON image data signals) into an analog output which is in turn delivered to the sub-modulator 56. This procedure takes 5 nanoseconds. The output from the digital/analog converter 62 is synchronized with the output from the delay circuit 52 to the main modulators 64.

An image data signals modulated by their respective main modulator 64 are combined together by the mixer 68 and transmitted to the sub-modulator 56. The combined image data signal is modulated according to the analog output of the digital to analog converter and then, fed to the AOM driver 20. As shown in FIG. 4, the modulation is increased in degree as the number of ON image data signals increases. The process of modulation with the main modulators 64 and the sub-modulator 56 are expressed by the combination of the characteristic curves shown in FIGS. 3 and 4 (see FIG. 5). In synchronicity with the transfer of a signal from the AOM driver 20 to the AOM 18, the laser emitter 12 is switched on by the laser power source 14 to emit a laser beam.

The laser beam emitted from the laser emitter 12 passes through the lens 16 to the AOM 18 where it is split into a plurality (8 in the embodiment) of sub-beams in the subscanning direction. The sub-beams are transmitted via the lens 24 and the mirror 26 to the polygon mirror 28, and their reflecting directions are varied for master scanning by the rotation of the polygon mirror 28.

The sub-beams reflected on the reflective surfaces of the polygon mirror 28 are directed by the mirrors 32 and 34 to the galvanometer 36. The galvanometer 36 is provided with a reflective surface thereof tilted in the subscanning direction during each master scanning with a laser beam. As the embodiment allows 8 sub-beams to scan at the same time, the tilting of the galvanometer 36 in the subscanning direction corresponds to an angle of 8-pitch.

The beams reflected on the galvanometer 36 are projected via the mirror 38 and the lens 40 onto the recording medium 44 on the stage 42 to record a given image.

In the operation of this embodiment, the degree of modulation is varied corresponding to the number of the ON image data signals. More particularly, for ensuring a beam output of constant intensity, depending on the ratio of ON to OFF image data signals, the input is identified as belonging to a common set of signals (of 9 types, 0 to 8) comprising the total possible combinations ($2^8=256$) of 8 image data signals in ON and OFF states and then delivered as a 4-bit signal ($2^4$) which is in turn converted into an analog output of one of 9 types. Accordingly, the analog output can be provided in a short time as compared with the procedure of counting the number of ON image data signals in each image. As a result, the duration of time required to record an image is reduced and the working efficiency is thus increased.

The data converter circuit 58 in the embodiment is provided to process data within a delay time of 65 nanoseconds and is therefore costly. However, a less expensive converter circuit, although its processing time is twice as long, may be arranged with the use of a pair of data converter circuits 80 and 82 which alternatively accept the image data signals fed in consecutively for parallel processing, as shown in FIG. 7. For this purpose, a selector 84 is provided downstream of both latches 60, 60 for supplying an input signal to the two latches 60, 60 alternatively at intervals of a given amount of time.

Figure 6:
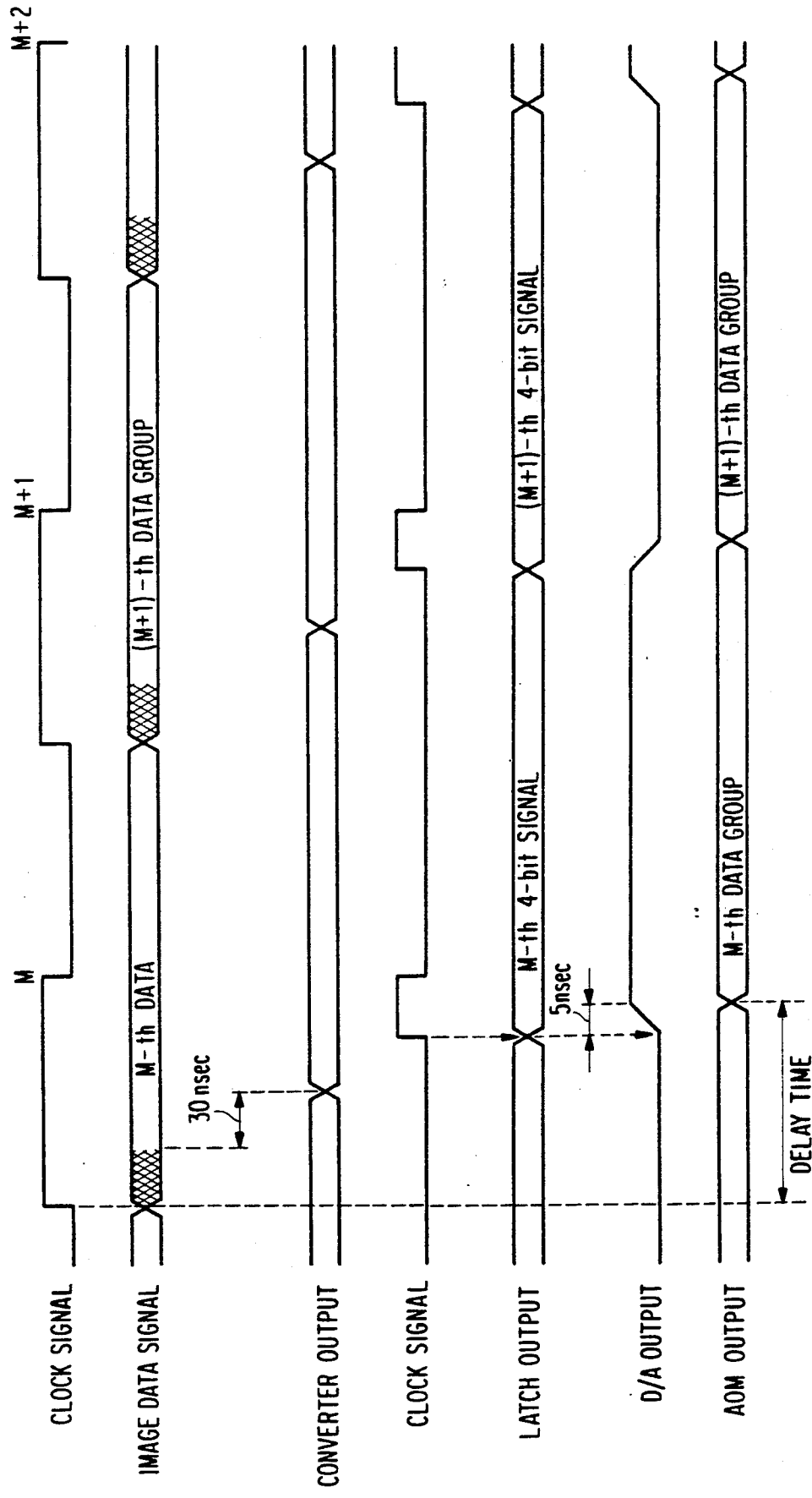
FIG. 6 is a time chart according to an embodiment of the present invention.

The corresponding time chart, similar to that of FIG. 6, is shown in FIG. 8 in which the peaks of a clock pulse are separated into odd and even number groups which correspond to the data converter circuits 80 and 82 respectively.

What is claimed is:

1. In a simultaneous multi-beam optical modulator device having a first modulating means for amplitude-modulating a plurality of carrier waves according to a plurality of input signals, to produce a plurality of modulated signals, and an audio optical device for separating an incoming beam of light in to a plurality of sub-beams, while, at a same time, optically modulating said sub-beams upon receiving said modulated signals from said first modulating means, an improvement comprising:

an output means having a map memory in which indicator signals corresponding to a number of input signals fed into said first modulating means are stored, for selecting from said map memory an indicator signal corresponding to the number of input signals supplied to said first modulating means when said output means is made to receive signals which are the same in number as said signals input to said first modulating means;

a digital/analog converting means for converting said indicator signal transmitted from said output means into an analog output which enables adjustment of the output of light from the audio optical device in proportion to the indicator signal from the output means so as to make the light output constant in intensity;

a delay means for delaying the plural input signals supplied to the first modulating means for a given amount of time; and a second modulating means for amplitude-modulating said plural modulated signals transmitted from said first modulating means according to said analog output of said digital/analog converting means, for supply to said audio optical device.

2. A simultaneous multi-beam optical modulator device according to claim 1, wherein delay time is determined so that said output of said digital/analog converting means is synchronized with said output of said delay means to said first modulating means.

3. A simultaneous multi-beam optical modulator device according to claim 1, further comprising a register for taking in at a given point in the timing sequence, the same number of signals as are supplied to said first modulating means and for transmitting the same number of signals to said output means.

4. A simultaneous multi-beam optical modulator device according to claim 1, further comprising a mixing means for combining all said plural modulated signals transmitted from said first modulating means together for transfer to the second modulating means.

5. A simultaneous multi-beam optical modulator device according to claim 1, wherein a plurality of said output means are arranged in parallel to each other.

6. A simultaneous multi-beam optical modulator device according to claim 1, wherein said digital/analog converting means is arranged so that said analog output increases as the number of the input signals to said output means is increased.

7. In a simultaneous multi-beam optical modulator device having an audio optical device for separating an incoming beam of light into a plurality of sub-beams and for, at the same time, optically modulating the same when a plurality of modulated signals are applied simultaneously, an improvement comprising:
   first modulators for respectively amplitude-modulating a plurality of carrier waves according to a plurality of supplied image signals, to output a plurality of modulated signals;
   a delay circuit for delaying for a given amount of time the plural image signals which will be transmitted to said first modulators;
   a data converter circuit having a map memory in which signals corresponding to the number of image signals fed to said first modulators are stored and which is adapted to select from said map memory an indicator signal corresponding to the number of input signals supplied to the first modulators, when said circuit is made to receive signals which are the same in number as the input signals to said first modulators;
   a digital/analog converter for converting said signal transmitted from said data converter circuit into an analog output which enables adjustment of the output of light from said audio optical device in proportion to the indicator signal from the output means so as to make the light output constant in intensity; and
   a second modulator for amplitude modulating said plural modulated signals transmitted from said first modulators according to said analog output of said digital/analog converter for supply to said audio optical device.

8. A simultaneous multi-beam optical modulator device according to claim 7, wherein delay time is determined so that said output of said digital/analog converter is synchronized with said output of said delay circuit to each first modulator.

9. A simultaneous multi-beam optical modulator device according to claim 7, further comprising a register for taking in at a given point in the timing sequence the same signals as are supplied to said first modulators and for transmitting said signals to said data converter circuit.

10. A simultaneous multi-beam optical modulator device according to claim 7, further comprising a mixer for combining said plural modulated signals transmitted from their respective first modulators together for transfer to said second modulator.

11. A simultaneous multi-beam optical modulator device according to claim 7, wherein a pair of said data converter circuits are arranged in parallel to each other for receiving the same signals as are supplied to said first modulators alternately.

12. A simultaneous multi-beam optical modulator device according to claim 7, wherein said digital/analog converter is arranged so that said analog output increases as the number of input signals to said data converter circuit are increased.

* * * * *